Figure 1:
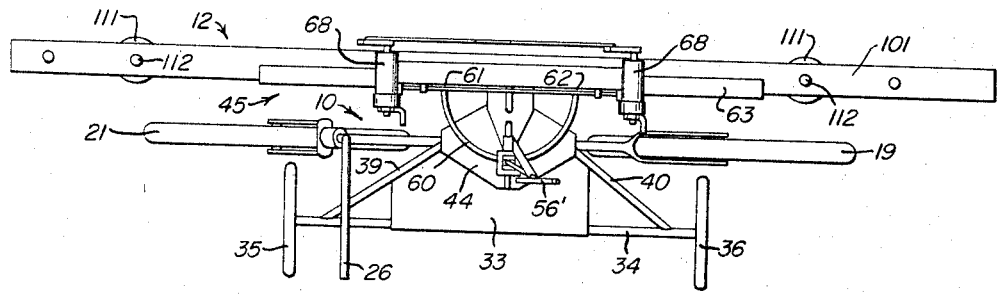

Nov. 12, 1968

P. MAHER ET AL 3,410,428

MATERIAL HANDLING APPARATUS

Filed June 21, 1966

4 Sheets-Sheet 1

INVENTORS
PAT MAHER
BENARD E. OWENS
BY
MALLINCKRODT & MALLINCKRODT

ATTORNEYS

Nov. 12, 1968
P. MAHER ET AL
3,410,428
MATERIAL HANDLING APPARATUS
Filed June 21, 1966
4 Sheets-Sheet 2
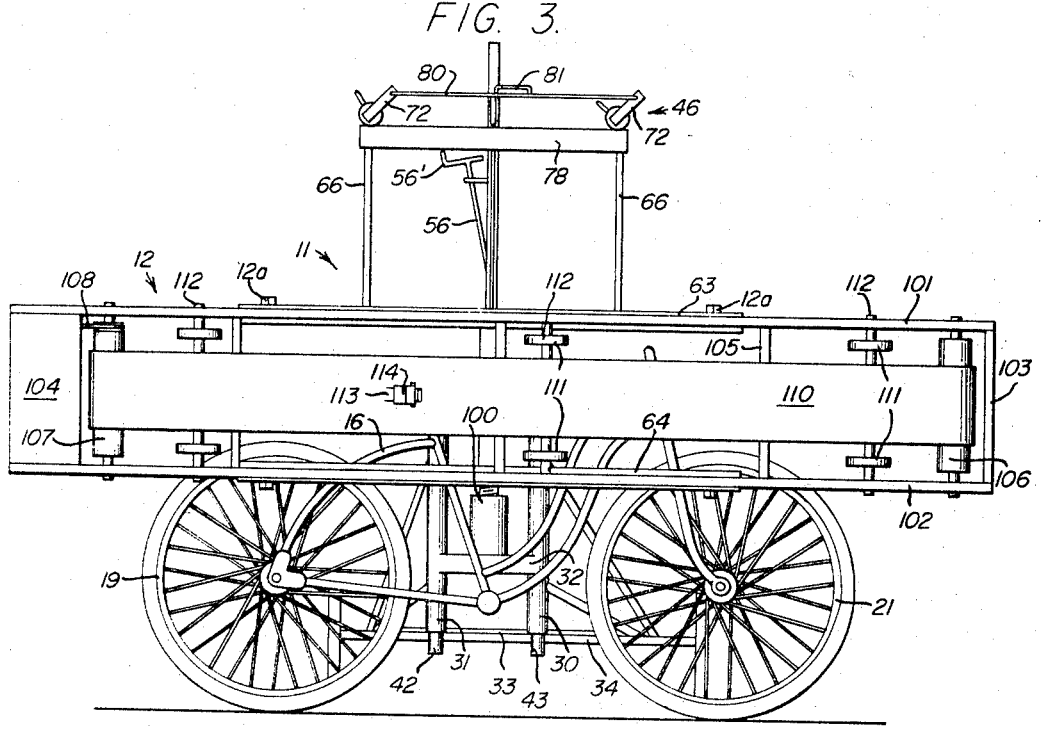
FIG. 3.
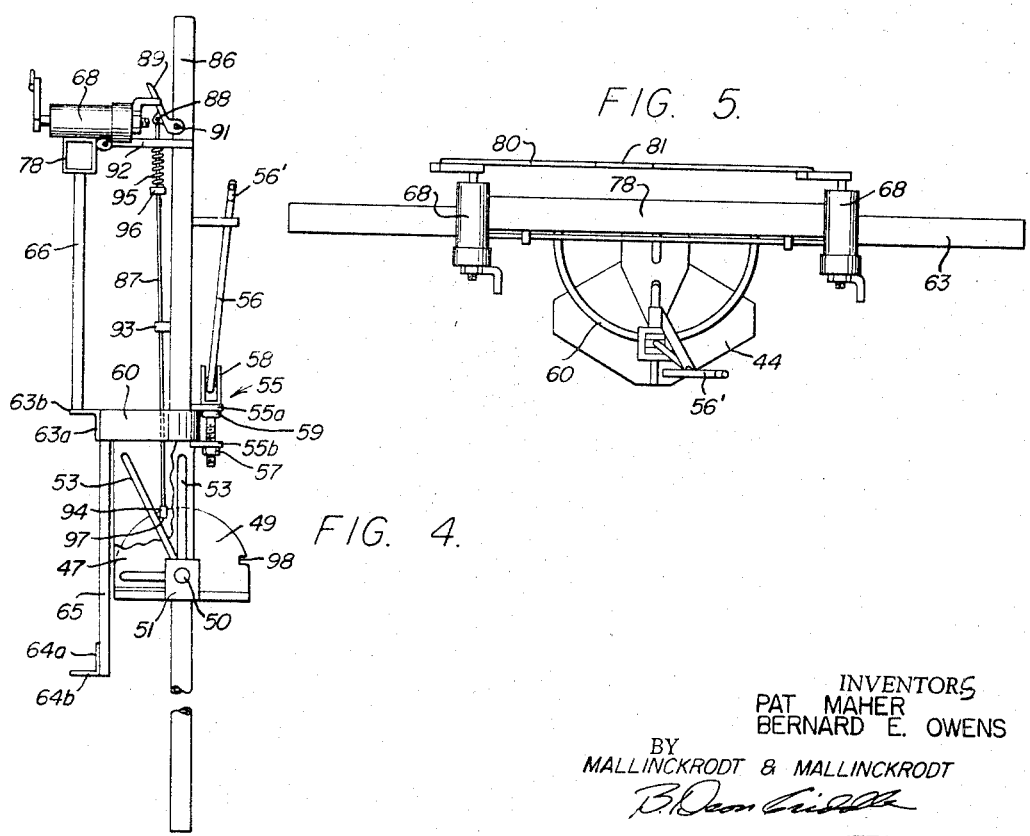
FIG. 4.
FIG. 5.
INVENTORS
PAT MAHER
BERNARD E. OWENS
BY
MALLINCKRODT & MALLINCKRODT
ATTORNEYS Nov. 12, 1968   P. MAHER ET AL   3,410,428
MATERIAL HANDLING APPARATUS
Filed June 21, 1966   4 Sheets-Sheet 3
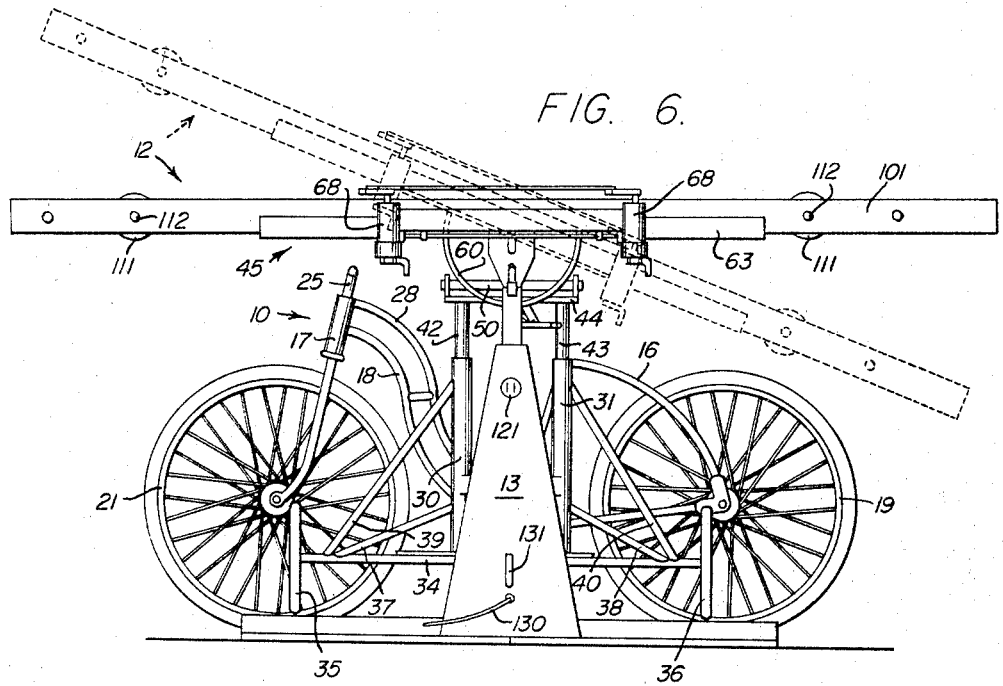
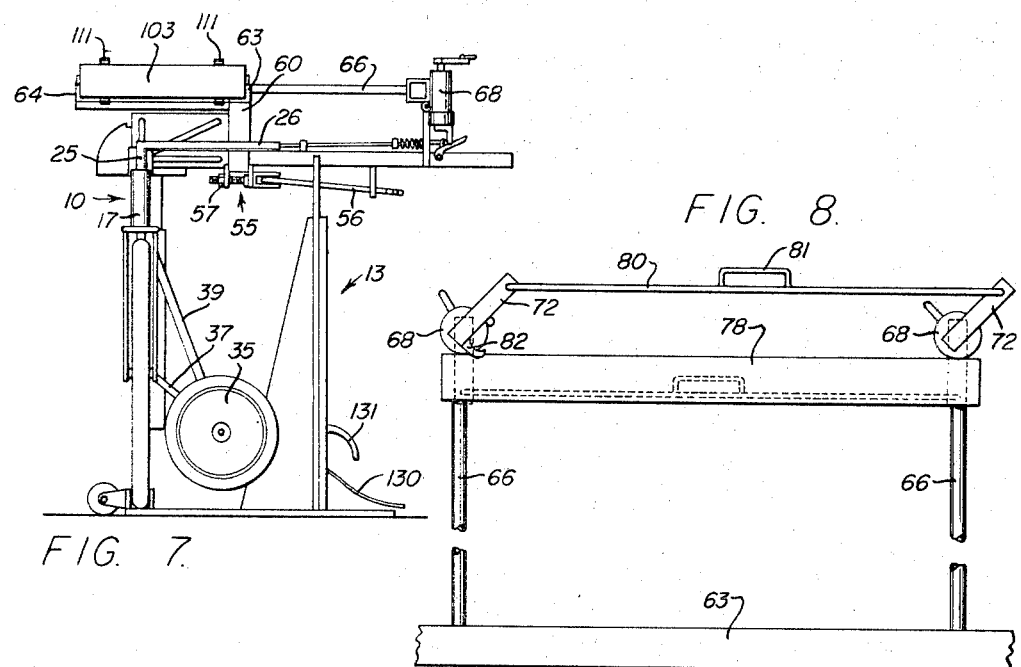
INVENTORS
PAT MAHER
BERNARD E. OWENS
BY
MALLINCKRODT & MALLINCKRODT
ATTORNEYS Nov. 12, 1968 P. MAHER ET AL 3,410,428
MATERIAL HANDLING APPARATUS
Filed June 21, 1966 4 Sheets-Sheet 4
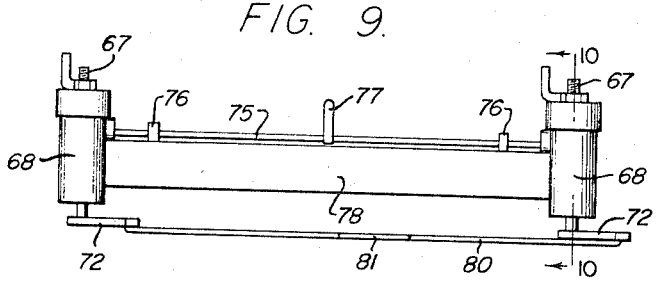
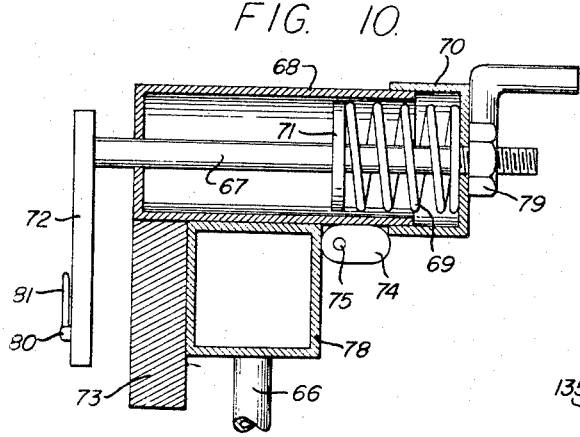
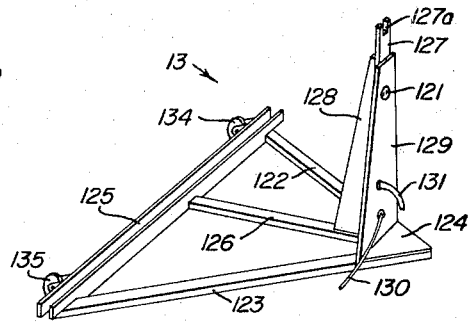
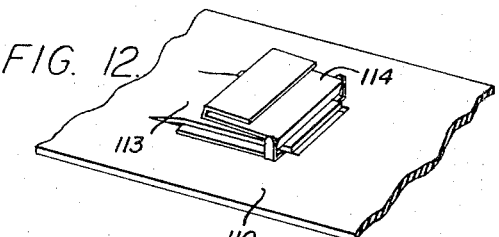
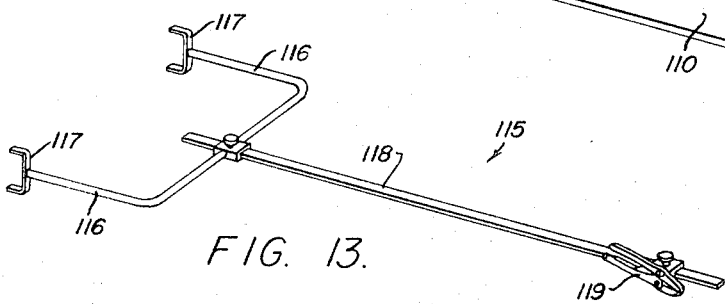
INVENTORS
PAT MAHER
BERNARD E. OWENS
BY
MALLINCKRODT & MALLINCKRODT
ATTORNEYS

United States Patent Office 3,410,428
Patented Nov. 12, 1968

3,410,428
MATERIAL HANDLING APPARATUS
Pat Maher, Broadus Stage, Miles City, Mont. 59301,
and Bernard E. Owens, Delta, Utah 84624
Filed June 21, 1966, Ser. No. 559,312
10 Claims. (Cl. 214—83.26)

Sheet rock wallboard and other large panel or sheet type building materials are so heavy and bulky that at least two men are normally required to carry and position them. Even two men find it difficult to handle large wallboard sheets when they must be lifted from floor level to workmen on an elevated platform or working area.

At the present time portable belt-type conveyors are commonly used to elevate the sheets from the ground level to a scaffolding on which workmen are positioned and two men are required to carry the sheets to the conveyor belt and to frequently reposition the conveyor as the work progresses.

It is an object of the present invention to provide a material handling apparatus that will enable a single workman to easily pick-up heavy, bulky panel-type construction material, carry it for even long distances to an area of use and to then quickly and easily elevate the sheet of material to a scaffold or other elevated structure used in connection with the placement of the material on a wall or ceiling.

Outstanding features of the invention include a wheeled bicycle-type frame having balance wheels at one side that can be used to reduce the turning radius of the apparatus a pivot support for a conveyor that can be pivoted on either of two axes, thereby positioning the conveying surface of the conveyor at the side or above the frame and either horizontal or tilted at a desired angle. A jack is used to elevate the pivot plate with respect to the frame so that the angular range through which the conveyor can be tilted while still clearing the frame can be increased.

There is shown in the accompanying drawings a specific embodiment of the invention representing what is presently regarded as the best mode of carrying out the generic concepts in actual practice. From the detailed description of this presently preferred form of the invention, other more specific objects and features will become apparent.

Figure 2:
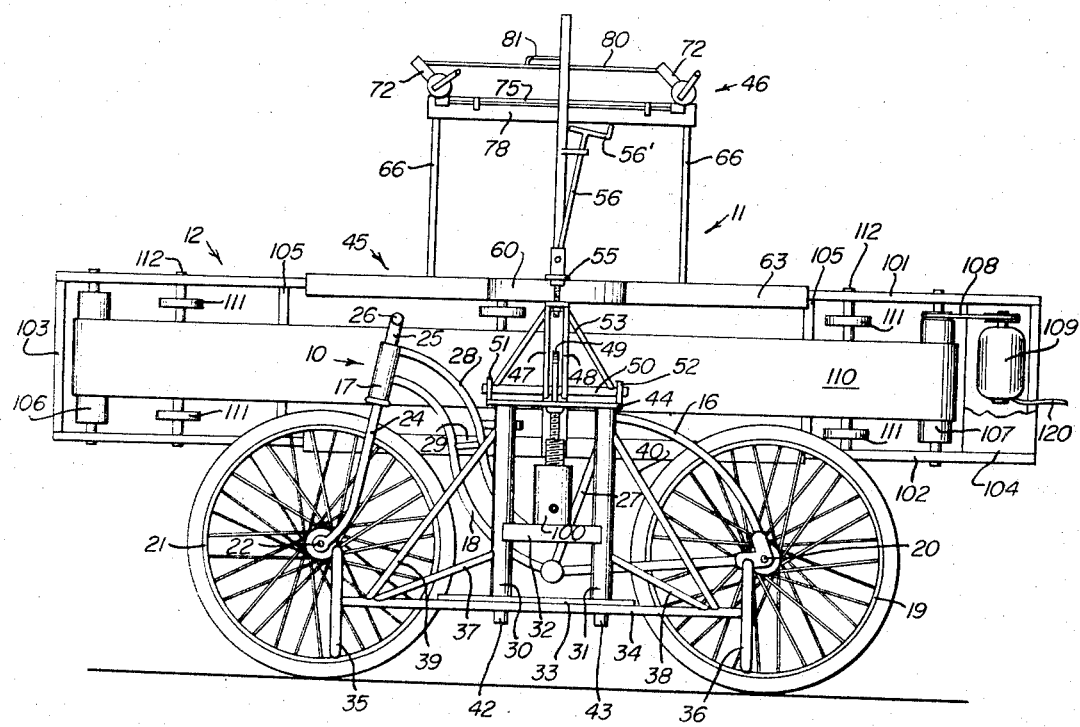

In the drawings:

FIG. 1 is a top plan view of the material handling apparatus of the invention, with the conveyor positioned at the side of the frame;

FIG. 2, a side elevation;

FIG. 3, a similar view of the other side;

FIG. 4, an end elevation view of the pivot platform and material clamp assembly;

FIG. 5, a top plan view of the pivot platform and material clamp assembly;

FIG. 6, a side elevation view like FIG. 2, but with the frame positioned in an alignment stand, the conveyor positioned horizontally above the frame and elevated slightly by the jack and with a material pusher in place on the belt of the conveyor, and with a tilted position of the conveyor shown in dotted lines;

FIG. 7, a front elevation of the apparatus as shown in FIG. 6;

FIG. 8, a fragmentary front elevation view of the material clamping assembly;

FIG. 9, a top plan view of the apparatus of FIG. 8;

FIG. 10, a vertical section taken on the line 10—10 of FIG. 9;

FIG. 11, a perspective view of the alignment stand;

FIG. 12, a perspective view of the one embodiment of belt clamp used as a pusher with the conveyor belt to move the sheet material with the belt shown fragmentarily; and FIG. 13, a similar view of another embodiment of belt clamp.

Referring now to the drawings:

In the illustrated preferred embodiment the material handling apparatus includes a bicycle-type frame shown generally at 10, a pivot plate and material clamp assembly shown generally at 11, a conveyor shown generally at 12 and an alignment stand shown generally at 13 (FIGS. 6, 7 and 11).

THE FRAME

The bicycle type frame includes a rear fork 16 and an elevated front sleeve 17 interconnected at their lower ends by a tubular frame member 18. A large rear wheel 19 is journalled on an axle 20 extending between the legs of rear fork 16 and a large front wheel 21 is journalled on an axle 22 extending between the legs of a front fork 24 that has a central upright post 25 passed upwardly through sleeve 17. Post 25 is freely rotatable within sleeve 17 and a handle 26 fixed to the other end of post 25 maintains the post in the sleeve and allows the front wheel to be turned to guide the apparatus.

The upper end of the rear fork is connected to one end of an inclined member 27, the other end of which is connected to the frame member 18, intermediate its length. A reinforcement frame member 28 interconnects the upper end of front sleeve 17 and inclined member 27 intermediate its length and a spacer 29 connects the frame member 18 and the reinforcement frame member 28. A pair of lone, parallel side sleeves 30 and 31 are fixed to the frame member 18 and extend upwardly therefrom before being connected to a cross bar 32 that extends between the inclined member 27 and the reinforcement frame member 28.

A platform 33, on which an operator can ride scooter fashion while transporting sheet material, extends outwardly from the lower ends of the side sleeves 30 and 31 and is fixed to an axle 34 having small wheels 35 and 36, journalled on its respective ends. Lower braces 37 and 38, respectively extend outwardly from the lower ends of side sleeevs 30 and 31 and into engagement with the ends of axle 34. Upper braces 39 and 40 extend from points adjacent the tops of the side sleeves downwardly to the axle. Platform 33 is then fixed to and supported by the axle, the side sleeves and the lower braces. As will be further explained, the small wheels normally hold the frame in a generally upright position and additionally serve as aids in the turning of the apparatus.

THE PIVOT PLATE AND MATERIAL CLAMP

The pivot plate and material clamp assembly, shown generally at 11 includes a pair of legs 42 and 43 that are adapted to respectively telescope into the side sleeves 30 and 31. A platform 44 overlapping and resting on the upper end of legs 42 and 43 serves as a stop to limit the telescoping of the legs and carries a platform or conveyor mounting assembly shown generally at 45 and a material clamping assembly shown generally at 46, both of which are fixed to a pair of pivot plates 47 and 48 that straddle an upright curved plate 49 and are fixed at their lower corners to a pivot pin 50. Upright curved plate 49 stands on platform 44 and the pivot pin 50 passes through plate 49 and upstanding ears 51 and 52 at opposite sides of the plate 49. Reinforcement rods 53 extend from each pivot plate to engage with pin 50 at points near the upstanding ears.

A U-shaped clamp member 55 has its back fixed to upper corners of pivot plates 47 and 48 and a rod 56 is passed freely through its legs 55a and 55b (FIG. 4) before being threaded into a nut 57 welded to the opposite side of leg 55b. Clevis connection 58 and collar 59 are fixed to rod 56 at opposite sides of the leg 55a. Thus, rotation of rod 56, as by turning of handle 56' will close or separate the legs 55a and 55b.

A rocker band 60 is passed through the U-shaped clamp member, between its back and the rod 56 so that as the rod is turned one direction to close the legs 55a and 55b they squeeze the mid-section of the band tightly between them. When the rod is turned the other direction, the legs of the clamp member release the band.

The ends of the rocker band are fixed at 61 and 62, respectively, to a long angle 63 that forms an upper conveyor guide. Another long angle 64 forms a lower conveyor guide and is held parallel to the upper conveyor guide by a connecting member 65. The angles are so arranged that the conveyor 12 will slide against the upright legs 63a and 64a to fit tightly between the protruding legs 63b and 64b. If found desirable the conveyor can then be bolted or otherwise secured to the conveyor guides, as by bolts 12a, shown in FIG. 3.

Spaced arms 66 extend upwardly from the upper conveyor guide and the clamping assembly is mounted on their upper end. If desired the arms 66 may be made of telescoping members that can be locked in extended positions.

The clamping assembly is adapted to engage and hold the edge of a panel of material as it is transported. Thus, it includes a pair of rods 67 (FIGS. 8–10), each passed through a sleeve 68 in which is positioned a spring 69 that acts between a telescoping cap 70 on the sleeve and an abutment 71 on the rod 67. A depending member 72 on the end of rod 69 is adapted to grip and hold the panel of material against a depending flange 73 and eccentrically mounted cams 74, fixed to the opposite ends of a rod 75 journaled through brackets 76 are adapted to move the rods 67 such that members 72 grip or release the material. Thus rotation of handle 77 on rod 75 to rotate cams 74 against the telescoping caps 70 will move the rods 67 so that members 72 are moved toward flange 73. As handle 77 is turned in the opposite direction the springs move the rods away from flange 73. A brace 78 preferably extends between the upper ends of spaced arms 66 and provides support means for the sleeves 68 and the brackets 76.

A nut 79, adjustably threaded onto each of the rods 67, limits the expansion of the associated spring 69 and provides an adjustment means for positioning members 72 to best clamp materials of varying thickness.

To facilitate movement of the members 72 from an out-of-the-way upturned position such as is shown in full lines in FIG. 8, to the clamping position shown in dotted lines the members 72 are pivotally interconnected by a lift bar 80. A handle 81 on lift bar 80 provides a convenient gripping means by which the lift bar can be manipulated to rotate the members 72. An abutment pin 82 protrudes from one member 72 alongside its associated sleeve 68 so that the pin will engage members 72 to limit their rotation and hold members 72 in their upturned positions.

The conveyor guides and conveyor 12 carried thereby and the clamping assemblies 68 and any material clamped thereto are all pivotable about the horizontal axis formed by pivot pin 50 from the material loading and carrying position at the side of the frame, as shown in FIGS. 1–5 to the material discharge position above the frame, as seen in FIGS. 6 and 7.

A handle 86 (FIG. 4) is fixed to and extends upwardly from pivot plates 47 and 48 to provide a lever that can be manipulated to pivot the conveyor guides, conveyor and clamping assemblies and material, and a latch mechanism is provided to hold them in set position.

The latch mechanism includes a rod 87 that has one of its ends pivotally connected at 88 to a lever 89, intermediate its ends. One end of the lever is pivotally connected at 91 to handle 86, adjacent to its free end. Rod 87 passes through guides 92 and 93 carried by handle 86 and terminates at its other end in a plate 94 that extends transverse to upright curved plate 49. A spring 95 surrounds rod 87 and acts against guide 92 on handle 86 and an abutment 96 on rod 87, so that plate 94 carried by rod 87 is normally spring biased against the curved surface of plate 49, or into one or the other of the notches 97 or 98 formed in the curved surface.

When plate 94 is in notch 97 the conveyor assembly and clamping assemblies are held in the loading and transporting position. However, if lever 89 is squeezed towards handle 86 rod 87 is moved axially and plate 94 is moved out of the notch. Handle 86 can then be manipulated to pivot the conveyor assembly and clamping assemblies to the material discharge position shown in FIG. 7. Spring 95 will then bias rod 81 such that plate 94 is moved into notch 98.

When the conveyor assembly and clamping assemblies are in their discharge position, FIGS. 6 and 7, the angle of discharge can be varied by turning the handle on rod 56 to open the legs 55a and 55b of clamp member 55, sliding rocker band 60 within the clamp member, and then turning handle 56 to fix the position of the rocker band. The angle of discharge can be varied even further, if desired, by operating a hydraulic jack 100, positioned on a frame member such that its ram acts beneath the pivot plate to raise it. As the pivot plate is raised, additional clearance is provided above rear wheel 19 to allow extra clearance of the conveyor and any material thereon as the conveyor assembly and clamping assemblies are tilted.

THE CONVEYOR

The conveyor includes long side rails 101 and 102 that are interconnected at their forward ends by a brace 103 and at their rear ends by a motor housing 104.

Spaced cross braces 105 provide additional support throughout the length of the conveyor.

An idler pulley 106 is journaled between the side rails at their forward ends and a drive pulley 107 is journaled between the rails at the rear end. The pulley 107 is driven through a belt 108 by a motor 109 mounted on housing 104.

An endless conveyor belt 110 is passed around the pulleys 106 and 107, but the material discharged from the conveyor is not placed directly on the conveyor belt. Rather, it rests on roller wheels 111 that are spaced along both sides of the belt and that are journaled for rotation on shafts 112, that also extend between the side rails. The belt acts as a pusher to propel sheet material from the conveyor and for this purpose it is provided with a series of cut-out flaps 113 to which a belt clamp 114, FIG. 12, or 115, FIG. 13, can be selectively attached.

The belt clamp is of conventional safety belt type that will grasp a cut out flap and hold it in a raised position while the clamp engages a rear edge of a sheet of material to push it from the conveyor. The reactionary force created when the material is contacted tends to more securely tighten the clamp onto the belt. After the sheet has been pushed from the belt the clamp is removed. As the rear edge of another sheet of material is moved onto the conveyor belt, and a cut out flap passes beneath the rear edge, the belt clamp can again be attached and the conveyor belt can again be used as a pusher. If the sheet of material is to be pushed a long distance from the end of the conveyor an extended pusher 115 such as is shown in FIG. 13 can be used. This pusher includes a pair of legs 116, at one end and a bifurcated sheet engaging member 117 at the end of each leg. The legs are adjustably joined to one end of an extension member 118, the other end of which is adjustably connected to a pair of standard vise-grip pliers 119. In use, the pliers are attached to a flap 113 and the spaced bifurcated members 117 are engaged with the rearmost edge of the sheet of material being elevated. The extended pusher will then support the sheet as it is moved across a gap, as for example, from the conveyor to another elevated conveyor.

Motor 109 may be electrically powered, in which case its power cord 120 will normally be plugged into an outlet 121, provided for the purpose in the alignment stand shown generally at 13.

THE ALIGNMENT STAND

Alignment stand 13 includes a triangular base made up of a pair of intersecting members 122 and 123 that are connected by a gusset plate 124 and a trough member 125 that interconnects the diverging ends of members 112 and 123. A brace member 126 extends between gusset plate 124 and the mid-point of trough member 125.

A post 127 extends up from brace member 126 and is braced by side gusset plates 128 connected to post 127 and to member 126 and by another plate 129 that is connected to post 127 and to gusset plate 124. A notch 127a is provided in the upper end of the post 127 to receive the handle 26, as will be further explained.

An electrical extension cord 130 has one end protruding from the bottom of plate 129 and its other end connected to the electrical outlet 121 at the upper portion of plate 129.

The alignment stand is light in weight and can easily be moved by a single workman. To make it even easier to move, however, the handle 130 is provided and dolly wheels 134 and 135 are affixed to the side of the trough member. A workman can then easily grasp the handle 130, tip the stand onto its wheels and roll it to any desired location.

THE OPERATION

In using the material handling apparatus of the invention the frame 10, pivot plate and material clamp assembly 11 and conveyor 12 are first assembled. This is done by inserting legs 42 and 43 of the pivot plate and material clamp assembly into the side sleeves 30 and 31 of the frame. The conveyor is then positioned between the angles 63 and 64 making up the conveyor guides.

Lever 89 is squeezed toward handle 86 and the conveyor guides, conveyor and material clamping assemblies are moved to the loading position at the side of the frame. The user will then roll the frame to where material to be handled is stockpiled, clamp a sheet of material between members 72 and flange 73, and roll the frame to the discharge location. The frame can be left in a somewhat tilted position, resting on small wheels 35 and 36, while the alignment stand is positioned and the large wheels 21 and 19 can then be guided into the trough formed by member 115.

Lever 89 is again squeezed toward handle 86 and the conveyor guides, conveyor material clamping assemblies and sheet of material carried thereby are moved to the position above the frame shown in FIGS. 6 and 7. Handle 84 is then rested in the notch 127a formed in upright post 127 and the frame 10 is held in a substantially vertical position. Handle 56' is next operated to release band 60, the discharge angle of the conveyor is set as desired, and handle 56' is turned to tighten clamp 55 and hold the band 60 secure.

The material clamps are operated to release the sheet of material and the cord 120 of motor 109 is plugged into outlet 131. If the extension cord 131 has not been previously connected to a source of electricity, it will now be so connected to start operation of motor 109 and the conveyor belt 110 driven thereby.

If the sheet of material extends beyond the rear of the conveyor it can be manually pushed over roller wheels 111 until its rearmost edge is in position to be engaged by a belt clamp 114 that is attached to a cut out flap 13. As the belt clamp contacts the sheet of material it will push the material along to the end of the conveyor. If the extended pusher is used the rear edge of the material can be fully supported as the front edge is moved onto a receiving platform or conveyor.

In this manner the sheet of material can be raised to workmen on a scaffolding or to a hoist and press unit adapted to raise it to and hold it against a ceiling.

Whereas this invention is here described and illustrated with respect to certain forms thereof, it is to be understood that many variations are possible without departing from the subject matter particularly pointed out in the following claims, which subject matter we regard as our invention.

We claim:
1. Material handling apparatus comprising:
   a bicycle-type frame, having a rear axis that is fixed with respect to the frame, a front wheel, journaled about a front axis arranged to be turned with respect to the rear wheel and the frame, and means for turning said front axis to thereby steer the said front wheel and the said frame;
   an endless conveyor, adapted to be carried on said frame;
   means on said frame for moving said conveyor from a position alongside the frame to a position above the frame; and
   means for releasably holding sheet material on said conveyor.

2. Material handling apparatus according to claim 1, wherein:
   the frame further includes a platform fixed to the frame and extending outwardly therefrom;
   an axle fixed to the platform and extending normal to the axis of the rear wheel; and wherein:
      the wheels further include a pair of spaced wheels, one of said wheels being journaled on each end of the axle.

3. Material handling apparatus according claim 1, further including:
   means for tilting the conveyor and for holding it at a desired discharge angle.

4. Material handling apparatus according to claim 1, further including:
   an axle fixed to and extending alongside the frame; and
   balance wheels journaled on said axle for rotation in planes normal to the longitudinal axis formed by the frame.

5. Material handling apparatus according to claim 1, further including:
   an alignment stand having a trough adapted to receive the wheels and means adopted to support the frame in an upright position.

6. Material handling apparatus according to claim 1, wherein the means on said frame for moving the conveyor from a position alongside the frame to a position above the frame includes:
   a first pivot axis positioned above and extending longitudinally of said frame;
   a second pivot axis extending transverse to said first pivot axis and providing an axis about which the angle of elevation of said conveyor can be changed;
   means for releasably fixing the position of the conveyor relative to said first pivot axis; and
   means for releasably fixing the position of said conveyor relative to said second pivot axis.

7. Material handling apparatus comprising:
   an upright frame;
   wheels on the frame;
   an endless conveyor adapted to be carried on the said frame, said conveyor including an elognate framework, a drive pulley journaled at one end of the framework, a tail pulley journaled at the other end of the framework, an endless belt passed around the drive and tail pulleys to have a discharge run and a return run, a plurality of roller wheels carried by said framework, said roller wheels being jounaled for rotation such that their roller surfaces extend beyond the discharge run of the belt, a drive motor carried by the framework, means interconnecting said drive motor and said drive pulley whereby operation of said motor rotates said pulley to drive the belt, and means carried by the belt for engaging and pushing sheet material resting on the rollers;

means on said frame for moving the conveyor from a position alongside the frame to a position thereabove; and means for releasably clamping material to the rollers of the said conveyor.

8. Material handling apparatus according to claim 7, wherein:

the belt has spaced flaps along the length; and means carried by the belt for engaging sheet material includes clamping means adapted to be clamped to said flaps and to engage said sheet material.

9. Material handling apparatus according to claim 8, wherein:

the clamping means includes a clamping portion for clamping the flaps;

a material engaging portion for engaging the sheet material; and an extension member adjustably connected between said clamping portion and said material engaging portion, whereby the distance between them can be set as desired.

10. Material handling apparatus comprising:
an upright frame;
wheels on the frame;

means for attaching a material handling platform to said frame, said attaching means including means for moving such platform from a position alongside the frame to a position above the frame, and holding means comprising a support frame extending outwardly substantially in the plane in which such platform is held, spaced clamp fingers on the outermost end of the support frame, linkage means interconnecting said fingers for pivotal movement together, spring means biasing said fingers away from the support frame, cam means adapted to be operated to move the fingers toward the support frame, and a handle on the linkage means, whereby movement of the handle will rotate the fingers between an out-of-the-way position and a position whereby actuation of the clamp means to move the fingers toward the support frame will clamp material between such material handling platform and the fingers to such platform and the support frame.

References Cited

UNITED STATES PATENTS

| | | |
|---|---|---|
| 1,708,761 | 4/1929 | Horbath. |
| 2,389,779 | 11/1945 | Heller _____ 214—83.26 |
| 2,620,934 | 12/1952 | Smoker _____ 214—83.26 |
| 2,828,870 | 4/1958 | Corley _____ 214—1 |
| 3,221,900 | 12/1965 | Love _____ 214—1 |
| 3,326,397 | 6/1967 | Lippmann et al. ____ 214—83.26 |

ALBERT J. MAKAY, *Primary Examiner.*